US012372893B2

(12) United States Patent
Masuko et al.

(10) Patent No.: US 12,372,893 B2
(45) Date of Patent: Jul. 29, 2025

(54) CARRIER, DEVELOPER, IMAGE FORMING METHOD, AND PROCESS CARTRIDGE

(71) Applicants: Kaede Masuko, Shizuoka (JP); Tohru Suganuma, Shizuoka (JP); Minoru Masuda, Shizuoka (JP); Masashi Nagayama, Shizuoka (JP); Hiroyuki Kishida, Shizuoka (JP); Tomomi Suzuki, Shizuoka (JP); Kento Takeuchi, Shizuoka (JP)

(72) Inventors: Kaede Masuko, Shizuoka (JP); Tohru Suganuma, Shizuoka (JP); Minoru Masuda, Shizuoka (JP); Masashi Nagayama, Shizuoka (JP); Hiroyuki Kishida, Shizuoka (JP); Tomomi Suzuki, Shizuoka (JP); Kento Takeuchi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 350 days.

(21) Appl. No.: 18/065,904

(22) Filed: Dec. 14, 2022

(65) Prior Publication Data

US 2023/0205108 A1 Jun. 29, 2023

(30) Foreign Application Priority Data

Dec. 23, 2021 (JP) ................................ 2021-208815
Apr. 15, 2022 (JP) ................................ 2022-067745

(51) Int. Cl.
*G03G 9/113* (2006.01)
*G03G 9/107* (2006.01)
(Continued)

(52) U.S. Cl.
CPC ........... *G03G 9/1139* (2013.01); *G03G 9/108* (2020.08); *G03G 9/1136* (2013.01); *G03G 13/08* (2013.01); *G03G 15/0875* (2013.01)

(58) Field of Classification Search
CPC .... G03G 9/1139; G03G 9/108; G03G 9/1136; G03G 13/08; G03G 15/0875
See application file for complete search history.

(56) References Cited

U.S. PATENT DOCUMENTS

| | | | | |
|---|---|---|---|---|
| 5,085,964 A * | 2/1992 | Kawata | G03G 9/1136 430/111.32 |
| 2009/0087771 A1 * | 4/2009 | Sawada | G03G 9/1139 430/110.2 |

(Continued)

FOREIGN PATENT DOCUMENTS

| | | |
|---|---|---|
| JP | 2010-078715 | 4/2010 |
| JP | 2011-145397 | 7/2011 |

(Continued)

*Primary Examiner* — Mark F. Huff
*Assistant Examiner* — Boone Alexander Evans
(74) *Attorney, Agent, or Firm* — Grüneberg and Myers PLLC

(57) ABSTRACT

A carrier is provided that includes a core particle and a coating layer coating the core particle. The coating layer includes a resin and chargeable inorganic fine particles, and has voids. The resin has an average film thickness of 0.10 μm or larger and smaller than 0.45 μm. The coating layer has a porosity of 0.1% or higher and lower than 2.8%, when the porosity expressed by the following equation:

$$\text{Porosity [\%]} = S1/S2 \times 100$$

where, on a cross section of the coating layer, S1 represents a cross sectional area of the voids and S2 represents a cross sectional area of the resin.

10 Claims, 2 Drawing Sheets

(51) Int. Cl.
*G03G 13/08* (2006.01)
*G03G 15/08* (2006.01)

(56) References Cited

U.S. PATENT DOCUMENTS

| | | | | |
|---|---|---|---|---|
| 2011/0171573 | A1 | 7/2011 | Sakata et al. | |
| 2014/0051022 | A1* | 2/2014 | Shoji .................... | G03G 9/1075 399/119 |
| 2018/0120724 | A1* | 5/2018 | Sakata ................. | G03G 9/1137 |
| 2020/0166867 | A1 | 5/2020 | Nagayama et al. | |
| 2020/0319571 | A1 | 10/2020 | Takeuchi et al. | |
| 2021/0141319 | A1 | 5/2021 | Takabayashi et al. | |
| 2022/0187729 | A1 | 6/2022 | Nagayama et al. | |
| 2022/0283523 | A1 | 9/2022 | Nagayama et al. | |
| 2022/0291603 | A1 | 9/2022 | Kishida et al. | |
| 2022/0291604 | A1 | 9/2022 | Suzuki et al. | |

FOREIGN PATENT DOCUMENTS

| | | |
|---|---|---|
| JP | 2011-209678 | 10/2011 |
| JP | 2016-212254 | 12/2016 |
| JP | 2017-167387 | 9/2017 |
| JP | 2021-076820 | 5/2021 |

* cited by examiner

CARRIER, DEVELOPER, IMAGE FORMING METHOD, AND PROCESS CARTRIDGE

CROSS-REFERENCE TO RELATED APPLICATIONS

This patent application is based on and claims priority pursuant to 35 U.S.C. § 119(a) to Japanese Patent Application No. 2021-208815 and 2022-67745, filed on Dec. 23, 2021 and Apr. 15, 2022, respectively, in the Japan Patent Office, the entire disclosure of each of which is hereby incorporated by reference herein.

BACKGROUND

Technical Field

The present disclosure relates to a carrier, a developer, an image forming method, and a process cartridge.

Related Art

In image formation using an electrophotographic technology, an electrostatic latent image is formed on an electrostatic latent image bearer such as a photoconductive substance, and a charged toner is deposited to this electrostatic latent image to form a toner image. Then this toner image is transferred and fixed to a recording medium to form an output image. In recent years, electrophotographic technology for multifunction peripherals and printers has rapidly expanded from monochrome printing to full-color printing, and the market of full-color printing is still expanding.

In full-color image formation, generally, all colors are reproduced by laminating three color toners of yellow, magenta, and cyan, or four color toners with black added. Therefore, to obtain a vivid full-color image with excellent color reproducibility, the surface of the fixed toner image should be smoothened to reduce light scattering. For this reason, many of conventional full-color copiers have achieved high-gloss images by increasing the amount of toner deposited to an electrostatic latent image to smooth the toner image. Thus, spent toner has been problematic, in which a deteriorated toner is deposited to a surface of a carrier during a long-term printing. The spent toner degrades the carrier to increase the carrier resistance and decrease chargeability of the carrier. When the chargeability of the carrier is decreased, so-called toner scattering occurs to contaminate the inside of the apparatus, which causes a malfunction such as erroneous detection by sensors.

SUMMARY

Embodiments of the present invention provide a carrier including a core particle and a coating layer coating the core particle, in which the coating layer includes a resin and chargeable inorganic fine particles, the coating layer has voids, and the resin has an average film thickness of 0.10 μm or larger and smaller than 0.45 μm. The carrier has a porosity of 0.1% or higher and lower than 2.8%, when the porosity is expressed by the following equation:

$$\text{Porosity } [\%] = S1/S2 \times 100$$

where, on a cross section of the coating layer, S1 represents a cross sectional area of the voids and S2 represents a cross sectional area of the resin.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
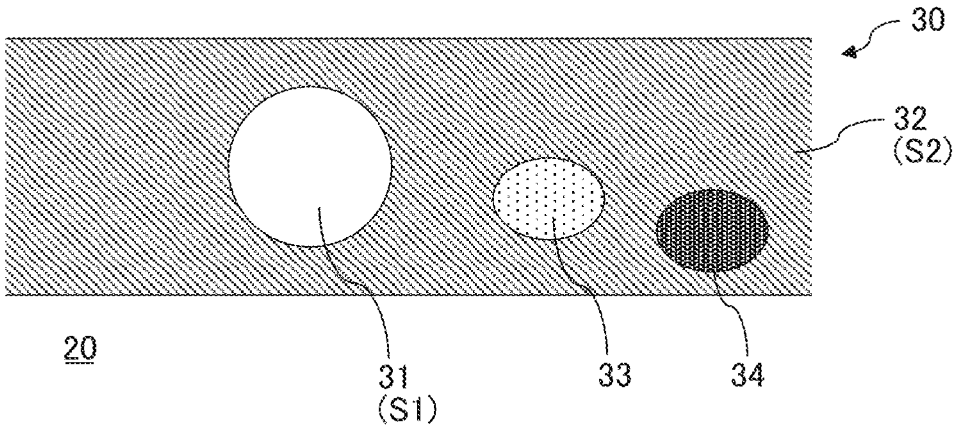
FIG. 1 is a schematic diagram for illustrating a porosity of a coating layer.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. The disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A carrier, a developer, an image forming method, an image forming apparatus, and a process cartridge, according to embodiments of the present disclosure will be explained below with reference to the drawings. It is to be noted that the present disclosure is not limited to the following embodiments, and changes such as other embodiments, addition, modification, and deletion can be made within a scope that can be conceived by a person skilled in the art, and any aspect is included within the scope of the present disclosure as long as the actions and effects of the present disclosure are exhibited.

According to an embodiment of the present disclosure, a carrier is provided that can sufficiently control charging for an image quality in the electrophotography field and can prevent toner scattering for an extended period of time even when using a low-temperature fixing toner.

(Carrier)

The carrier according to an embodiment of the present disclosure includes a core particle and a coating layer coating the core particle, in which the coating layer includes a resin and chargeable inorganic fine particles, the coating layer has voids, and the resin has an average film thickness of 0.10 μm or larger and smaller than 0.45 μm. The carrier has a porosity of 0.1% or higher and lower than 2.8, when the porosity is expressed by the following equation:

$$\text{Porosity } [\%] = S1/S2 \times 100$$

where, on a cross section of the coating layer, S1 represents a cross sectional area of the voids and S2 represents a cross sectional area of the resin.

The coating layer may be referred to as e.g. film layer, carrier-coated layer, coat layer, resin layer, coating film, coat film, and coating resin layer.

The carrier according to an embodiment of the present disclosure can be used for forming electrophotographic images, and the present disclosure can provide a developer, an image forming method, an image forming apparatus, and a process cartridge using an electrophotographic technology.

Chargeable inorganic fine particles (e.g. referred to as chargeable filler in some cases) included in the coating layer can enhance chargeability of the toner, and the chargeable inorganic fine particles in a surface layer of the carrier can maintain chargeability even after outputting manuscripts with a large printed area (also referred to as a high image area) for a long period of time. Thus, inclusion of chargeable inorganic fine particles in the coating layer can reduce abnormalities such as toner scattering and background fog associated with decreased charging.

As in the conventional technology, a large thickness of a coating layer prevents the carrier from being scraped, and toner components are spent on a surface layer of the carrier, resulting in decreased charging over time. On the other hand, a small thickness of a coating layer may prevent the toner from being spent, but a durability of the coating layer decreases and the chargeable inorganic fine particles are readily detached. This results in decreased charging over time.

As a result of intensive studies, the inventors of the present invention have emphasized that the coating layer contains a resin and chargeable inorganic fine particles, and the portion of the resin (hereinafter may be "resin portion" or "coating resin") has an average film thickness of 0.10 μm or larger and smaller than 0.45 μm. If the average film thickness of the resin portion is 0.45 μm or larger, the coating layer becomes thicker and the carrier scraping is prevented. This causes a problem that toner components are spent on the carrier surface layer, resulting in decreased charging over time. If the average film thickness of the resin portion is smaller than 0.10 μm, the coating layer becomes thinner and a durability of the carrier film decreases. Therefore, the chargeable inorganic fine particles are readily detached over time, and charging decreases over time even when the film is thin in some cases. For these reasons, preferably the resin portion has an average film thickness of 0.10 μm or larger and smaller than 0.45 μm.

As a result of further studies to solve the conventional problems, the inventors have considerably emphasized that voids are included in the coating layer. The inclusion of the voids in the coating layer makes it possible to expose the chargeable inorganic fine particles contained in the coating layer to the surface over time, resulting in stable charging over time.

The voids in the coating layer meet predetermined conditions.

It is preferable that the carrier has a porosity of 0.1% or higher and lower than 2.8%, when the porosity is expressed by the following equation:

$$\text{Porosity [\%]} = S1/S2 \times 100$$

where, on a cross section of the coating layer, S1 represents a cross sectional area of the voids and S2 represents a cross sectional area of the resin is defined as a porosity, the A porosity of 0.1% or higher and lower than 2.8% makes it possible to expose the chargeable inorganic fine particles contained in the coating layer to the surface in an appropriate extent over time, resulting in stable charging over time. If the porosity is lower than 0.1%, toner components are spent, resulting in decreased charging. If the porosity is 2.8% or higher, the resin layer (coating layer) is brittle, and the fillers are detached, resulting in decreased charging.

As a result of studies, the inventors have found that the film thickness of the resin portion and the porosity of the voids in the coating layer are specified within an appropriate rang to obtain a good result. The reason why the durability of the coating layer of the carrier is deteriorated is because the coating layer has voids. It is thought that, when the coating layer is a thin film, the durability of the coating layer can be increased by lowering the porosity to prevent the detaching of the chargeable inorganic fine particles contained in the coating layer. However, even when the coating layer is thin, if the voids in the coating layer are eliminated, the toner gets spent as in the case of thick film, and good chargeability cannot be obtained.

Thus, the inventors have found that good results can be obtained by setting the average film thickness of the resin portion containing the chargeable inorganic fine particles within the above range and setting the porosity of the voids in the coating layer within the above range. According to an embodiment of the present disclosure, it is possible to sufficiently control charging for an image quality in the electrophotography field and to prevent toner scattering for an extended period of time. It is possible to provide a carrier that can prevent toner scattering for an extended period of time even when using a low-temperature fixing toner.

In addition, the present disclosure provides a good result even when the coating layer contains a dispersing agent, and provides a good result even when adhesiveness between the resin and the chargeable inorganic fine particles in the carrier is high.

Also in a case in which the coating layer contains a dispersing agent or a case in which adhesiveness between the resin and the chargeable inorganic fine particles in the carrier is high, toner scattering is prevented for an extended period of time when using a low-temperature fixing toner.

Specific examples of a method for setting the porosity within the above range include, but are not limited to, a method using a defoaming agent, and a method of controlling the addition amount of the defoaming agent.

FIG. 1 is a schematic diagram for illustrating a porosity of a coating layer. In FIG. 1, a core particle 20 and a coating layer 30 that covers the core particle 20 are schematically illustrated. In FIG. 1, a part of the carrier particle is illustrated exclusively. The coating layer has a void portion 31, a resin 32, a chargeable inorganic fine particle 33, and a conductive component 34. In a condition that a cross sectional area of the void portion 31 is defined as S1 and a cross sectional area of the resin portion 32 is defined as S2, the porosity [%] can be determined in accordance with the following equation.

$$\text{Porosity [\%]} = S1/S2 \times 100$$

Figure 2:
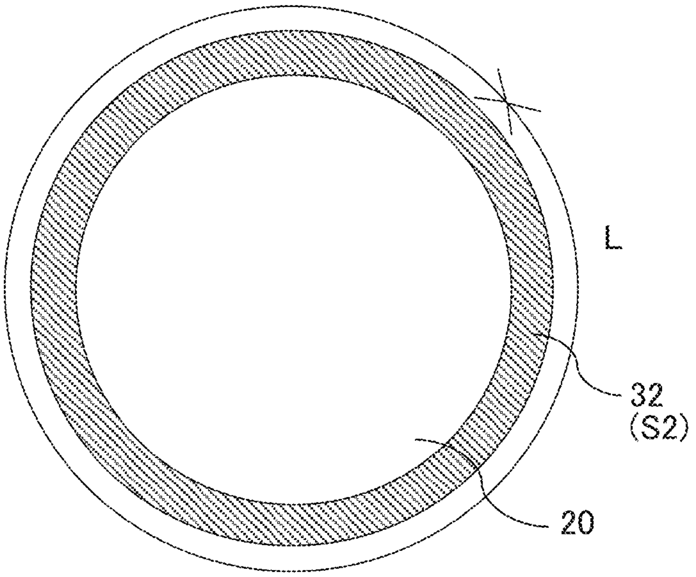
FIG. 2 is a schematic diagram for illustrating an average film thickness of the coating layer.

FIG. 2 is a schematic diagram for illustrating an average film thickness of the resin portion. In FIG. 2, the core particle 20 and the coating layer that covers the core particle 20 are schematically illustrated. In the coating layer illustrated in FIG. 2, the void, the chargeable fine particle, and other components are omitted. In a condition that an outer circumference length of the carrier is defined as L and the cross sectional area of the resin portion 32 is defined as S2, the average film thickness [μm] of the resin portion can be determined in accordance with the following equation.

$$\text{Average Film Thickness [μm]} = S2/L$$

The cross sectional area S2 of the resin portion may be calculated by subtracting the cross sectional areas of the voids, the chargeable fine particles, the conductive component, and other components from the cross sectional area of the entire coating layer. For example, in a condition that, on the cross section of the coating layer, the cross sectional area of the entire coating layer is defined as S3 and the total cross sectional area of the conductive component and the chargeable inorganic fine particles in the coating layer is defined as S4, the cross sectional area S2 of the resin portion may be calculated in accordance with the following equation.

$$S2=S3-S1-S4$$

<Chargeable Inorganic Fine Particles>

The coating layer according to an embodiment of the present disclosure includes chargeable inorganic fine particles, and optionally other components.

Preferably, the chargeable inorganic fine particles can be selected as appropriate from generally known inorganic fine particles such as barium sulfate, magnesium oxide, magnesium hydroxide, and hydrotalcite. For example, since these materials can be positively chargeable, the materials reliably provides a charge imparting ability for an extended period of time when used in combination with a negatively chargeable toner. Particularly, barium sulfate is desirably used because barium sulfate has high chargeability for the negatively chargeable toners and has white color, and therefore scarcely affects the color of the toner even when detached from the coating resin.

Preferably, the chargeable inorganic fine particles have a circle-equivalent diameter of 400 nm or larger and 900 nm or smaller (0.4 μm or larger and 0.9 μm or smaller). When the diameter is within this range, the chargeable inorganic fine particles can be present convex from the surface of the coating layer to improve the chargeability with the toner.

It is preferable that the circle-equivalent diameter of the chargeable inorganic fine particles is 900 nm or smaller, because the particle diameter of the chargeable inorganic fine particles is not too large relative to the thickness of the coating layer, and therefore the particles are sufficiently retained by a binder resin and are less likely to be detached from the coating layer. More preferably, the circle-equivalent diameter of the chargeable inorganic fine particles is 600 nm or larger. In this case, chargeability is more reliable, and developing potential is enhanced. The circle-equivalent diameter of the chargeable inorganic fine particles can be calculated by cutting the carrier using an ion milling and observing the cross section by a scanning electron microscopy (SEM) and an energy dispersive X-ray analysis (EDX).

When using barium sulfate as the chargeable inorganic fine particles, it is preferable that an amount of barium exposed to the surface of the coating layer is 0.1 atomic % or more. Charge exchange for charging the toner takes place on the surface layer of the coating layer, and therefore, a carrier with extremely little barium sulfate exposed to the surface of the coating layer cannot exhibit the charge imparting ability of the barium sulfate except that the coating layer is greatly scraped off after long-term use of the carrier. The amount of barium exposed to the surface of the coating layer is preferably 0.1 atomic % or more, because the charge imparting ability can be exhibited in a case that the coating layer is scraped off as well as in a case that toner components are deposited to (or spent on) the carrier surface layer due to long-term use.

<Conductive Component>

Preferably, the carrier according to an embodiment of the present disclosure includes conductive components in the coating layer. In the present disclosure, the conductive component refers to a component that is included in the coating layer and increases conductivity for a coating resin with low conductivity. The conductive component can be selected as appropriate from generally known components, and, as the inorganic fine particles, conventional materials and novel materials can be used as long as the particles have a powder resistivity of 200 Ω·cm or lower.

Taking into account that the coating layer is gradually scraped off due to long-term use, it is preferable that the conductive component is as white as possible, or as close to colorless as possible. In this case, even if the coating layer is gradually scraped off due to long-term use and the conductive component that can serve as a resistance adjusting agent are detached from the carrier surface, color contamination of the toner can be prevented.

Specific examples of the material that is used as a conductive component and has a good color and a good conductive function include, but are not limited to, compounds obtained by doping tin oxide with any of tungsten, indium, and phosphorus, or any of their oxides. Each of these compounds can be used either alone or as fine particles prepared by providing these compounds on surfaces of base particles.

As the base particles, either a conventionally known material or a novel material can be used. Specific examples of the base particles include, but are not limited to, aluminum oxide and titanium oxide.

Preferably, the inorganic fine particles used as the chargeable components have a circle-equivalent diameter of 600 nm or larger and 1,000 nm or smaller. If the circle-equivalent diameter is 600 nm or larger, the particle diameter is not too small, and the carrier resistance can be efficiently decreased. If the circle-equivalent diameter is 1,000 nm or smaller, the inorganic fine particles are less likely to be detached from the surface of the coating layer.

The conductive polymer particles may be used as the conductive component. The conductive polymer particles refer to fine particles including a conductive polymer and dopant ions, which are, in a fine particle state, dispersed in a solution or in the resin of the coating layer to develop conductivity. The conductive polymer is present in a fine particle state together with dopant ions, so that the conductive polymer can be dispersed in the coating layer forming liquid (which may be referred to as e.g. coating liquid, carrier coating liquid) and can acquire the conductivity imparting ability after the carrier is coated with the conductive polymer. In addition, even when the particles are detached from the coating layer, the toner is not discolored, and thereby deterioration of the image quality due to color staining can be prevented.

Although the conductive polymer particles are not particularly limited, it is preferable to use polyethylene dioxythiophene (PEDOT) as the conductive polymer. Furthermore, the conductive polymer is preferably PEDOT/PSS using polystyrene sulfonic acid (PSS) as a dopant ion. Other examples of the conductive polymer include, but are not limited to, polythiophene, polythiophene derivative, polypyrrole, polypyrrole derivative, polyaniline, and polyaniline derivative.

Specific examples of the dopant ion include, but are not limited to, β-naphthalene sulfonic acid, dodecyl sulfonic acid, p-dodecylbenzene sulfonic acid, 10-camphorsulfonic acid, 1,2-benzenedicarboxylic acid-4-sulfonic acid-1,2-di(2-ethylhexyl) ester, and sulfoisophthalic acid ester, as well as high molecular weight strong acidic substances.

When the conductive component having a resistance adjusting function is less likely to be detached, the carrier resistance is less likely to fluctuate, and the image quality is more stable.

<Dispersing Agent>

Preferably, the carrier according to an embodiment of the present disclosure contains a dispersing agent. A dispersing agent is blended in the coating layer forming liquid containing a resin (binder resin), inorganic fine particles, a diluent solvent, and other components, so that the inorganic fine particles can be dispersed down to a primary particle diameter, and a particle size distribution can be narrowed. As a result, fine particles that are weakly fixed to the surface of the carrier without being sufficiently embedded in the binder resin, such as coarse particles, can be eliminated. The aforementioned fine particles are readily detached due to stress in the early stage of printing to decrease carrier resistance and thereby cause the carrier to be deposited to a solid image portion, but this deposition can be prevented by inclusion of a dispersing agent in the carrier. The explanation of the inorganic fine particles described herein is common to inorganic fine particles used as the chargeable inorganic fine particles and the conductive component.

Preferably, the dispersing agent includes both a functional group with affinity to the resin and a functional group with affinity to the inorganic fine particles. Inclusion of the both functional groups provides an effect of improving the affinity to the resin and to the inorganic fine particles. As a result, adhesiveness between the resin and the inorganic fine particles in the coating layer can be improved to form a stronger film, and the inorganic fine particles are less likely to be detached from the coating layer even under stress in the printing process over time. Thus, the occurrence of carrier deposition on solid image portions can be prevented over time. In addition, detaching of the inorganic fine particles responsible for charging with the toner can be prevented, so that the ability of charging with the toner can be maintained over time, and toner scattering is less likely to occur.

The dispersing agent is not particularly limited. Specific examples of the dispersing agent include, but are not limited to, phosphate-based surfactants, sulfate-based surfactants, sulfonic acid-based surfactants, and carboxylic acid-based surfactants. Above all, phosphate-based surfactants are preferable. In this case, the inorganic fine particles can be desirably dispersed down to the primary particle diameter, and the inorganic fine particles in the coating layer can be homogenized to improve the affinity between the resin and the inorganic fine particles.

As a result of studies, the inventors have found that a margin for the toner scattering can be further improved by adding a dispersing agent having phosphate structure. This is because the phosphate structural portion is positively charged against the negatively charged toner. Furthermore, this is because the addition of a dispersing agent containing a phosphate improves the chargeability with the toner compared to the case without the addition of the phosphate. In particular, since the chargeability immediately after mixing and stirring the dispersing agent together with the toner, i.e. charge rising property is improved, a significant effect can be exhibited on the problem of toner scattering during replenishment, in which the toner is not sufficiently charged and scatters during replenishment.

When using a phosphate-based surfactant as a dispersing agent, it is preferable that the phosphate-based surfactant contains a phosphate as a main component. The term “as a main component” in the present embodiment means that the proportion of the phosphate in the dispersing agent is preferably 50% by mass or more, more preferably 90% by mass or more.

Specific examples of commercially-available products thereof include, but are not limited to, SOLSPERSE 2000, 2400, 2600, 2700, and 2800 (manufactured by Zeneca), AJISPER PB711, PA111, PB811, and PW911 ((manufactured by Ajinomoto Co., Inc.), EFKA-46, 47, 48, and 49 (manufactured by EFKA Chemicals B.V.), DISPERBYK 160, 162, 163, 166, 170, 180, 182, 184, and 190 ((manufactured by BYK-Chemie GmbH), and FLOWLEN DOPA-158, 22, 17, G-700, TG-720W, and 730W (manufactured by Kyoeisha Chemical Co., Ltd.).

<Defoaming Agent>

Preferably, the carrier according to an embodiment of the present disclosure is blended with a defoaming agent. Blending of the defoaming agent makes it possible to prevent foaming of the coating liquid, to prevent generation of holes (voids) in the coating layer, and to control the voids within the aforementioned porosity range.

The defoaming agent is not particularly limited. Specific examples of the defoaming agent include, but are not limited to, silicone-based materials, acryl-based materials, and vinyl-based materials. Above all, silicone-based materials are preferable. Exhibition of the defoaming effect significantly depends on a balance between compatibility and incompatibility with the solvent, and the silicone-based materials have a good balance between the compatibility and incompatibility. Therefore, even a small amount of silicone material can provide a high defoaming effect to control generation of voids in the coating layer.

Specific examples of commercially-available products thereof include, but are not limited to, KS-530, KF-96, KS-7708, KS-66, and KS-69 (manufactured by Silicone Division of Shin-Etsu Chemical Co., Ltd.), TSF451, THF450, TSA720, YSA02, TSA750, and TSA750S (manufactured by Momentive Performance Materials Inc.), BYK-065, BYK-066N, BYK-070, BYK-088, and BYK-141 (manufactured by BYK-Chemie GmbH), and DISPARLON 1930N, DISPARLON 1933, and DISPARLON 1934 (manufactured by Kusumoto Chemicals, Ltd.).

A proportion of the defoaming agent can be selected as appropriate. A proportion of the defoaming agent is preferably 1.0 parts by mass or more and 10.0 parts by mass or less, more preferably 2.0 parts by mass or more and 7.0 parts by mass or less based on 100 parts by mass of the total amount of the coating layer forming liquid that forms the coating layer (coating liquid). If the proportion of the defoaming agent is less than 1.0 parts by mass, the defoaming effect is not sufficiently obtained and voids are generated in the coating resin. If the proportion of the defoaming agent is more than 10.0 parts by mass, a defect called “cissing” appears on the surface of the coated film, the coating layer on the carrier surface becomes brittle, the inorganic fine particles are readily detached, and carrier deposition on a solid image portion is deteriorated.

The amount of the defoaming agent to be added to 100 parts by mass of the coating liquid is preferably from 1.0 parts by mass or more and 10.0 parts by mass or less, more preferably 2.0 parts by mass or more and 7.0 parts by mass or less.

<Resin>

The resin contained in the coating layer (also referred to as e.g. a coating resin) can be selected as appropriate from generally known resins. Specific examples of the resin include, but are not limited to, silicone resins and acrylic resins, which may be used in combination. Particularly, it is preferable to use a silicone resin and an acrylic resin in combination.

The acrylic resins are very excellent in abrasion resistance because of strong adhesiveness and low brittleness, but, on the other hand, the acrylic resins have a high surface energy and therefore may cause malfunctions such as decrease in charge amount due to accumulation of toner component spending in a case of a combination with a toner that is readily spent. The silicone resins have a low surface energy, which makes it difficult for the toner components to be spent, and therefore an effect of preventing the progress of the spent component accumulation by film scraping can be obtained, and the malfunctions can be solved.

Silicone resins have weak adhesiveness and high brittleness and therefore also have a disadvantage of poor abrasion resistance. Thus, it is significant to balance two characteristics of this resin. This case exhibits a remarkable improvement effect because it is possible to obtain a coating layer that makes it difficult to spend the toner and has abrasion resistance.

This is because the silicone resins have a low surface energy, which makes it difficult for the toner components to be spent, and therefore an effect of preventing the progress of the spent component accumulation by film scraping can be obtained.

The term "silicone resin" described herein refers to all generally known silicone resins. Specific examples of the silicone resin include, but are not limited to, straight silicones consisting only of organosiloxane bonds, as well as silicone resins modified with e.g. alkyd, polyester, epoxy, acryl, or urethane.

A commercially available product of the silicone resin can be selected as appropriate from generally known products.

Specific examples of the straight silicone resins include, but are not limited to, KR271, KR255, KR152 manufactured by Shin-Etsu Chemical Co., Ltd., and SR2400, SR2406, SR2410 manufactured by Dow Corning Toray Silicone Co. Ltd. In this case, each of these silicone resins may be used alone or in combination with other components such as a cross-linking component and a charge amount controlling component.

Specific examples of the modified silicone resins include, but are not limited to, KR206 (alkyd-modified), KR5208 (acryl-modified), ES1001N (epoxy-modified), KR305 (urethane-modified) manufactured by Shin-Etsu Chemical Co., Ltd., and SR2115 (epoxy-modified), and SR2110 (alkyd-modified) manufactured by Dow Corning Toray Silicone Co. Ltd.

In the present specification, acrylic resins refer to all resins containing an acrylic component and are not particularly limited. Each of the acrylic resins may be used alone or in combination with at least one of other components such as a cross-linking component. Specific examples of the other cross-linking components include, but are not limited to, amino resins and acidic catalysts. Specific examples of the amino resins described herein include, but are not limited to, guanamine resins and melamine resins. The acidic catalysts described herein refer to all materials having a catalytic action. Specific examples thereof include, but are not limited to, those having a reactive group such as a completely alkylated type, a methylol group type, an imino group type, and a methylol/imino group type.

Preferably, the carrier according to an embodiment of the present disclosure has a volume average particle diameter of 28 μm or larger and 40 μm or smaller. If the volume average particle diameter of the carrier is 28 μm or larger, carrier deposition can be prevented, and if the volume average particle diameter is 40 μm or smaller, decrease in reproducibility for image details can be prevented, and failure in formation of high definition images can be prevented.

The volume average particle size can be measured, for example, using a MICROTRAC particle size distribution meter model HRA9320-X100 (manufactured by NIKKISO CO., LTD.).

Preferably, the carrier according to an embodiment of the present disclosure has a volume resistivity of 8 to 16 Log Ω·cm.

If the volume resistivity is 8 Log Ω·cm or higher, carrier deposition does not occur in non-image portions, and if the volume resistivity is 16 Log Ω·cm or lower, an edge effect does not reach an unacceptable level.

Figure 3:
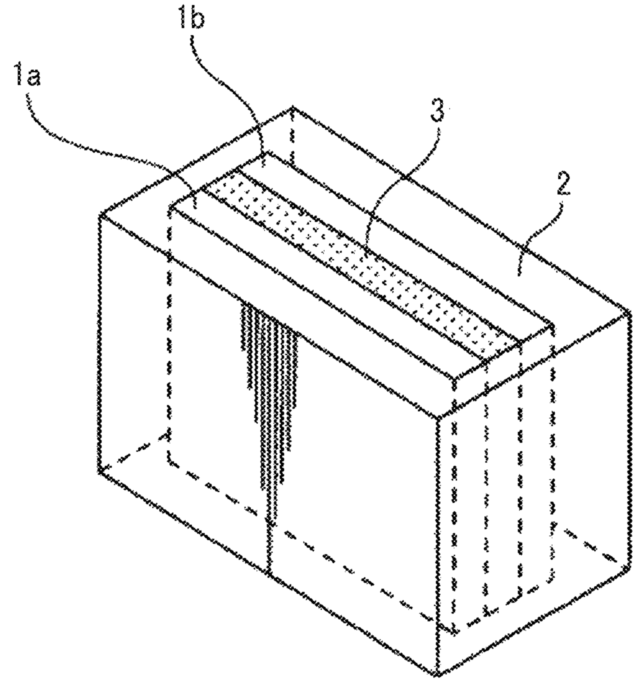
FIG. 3 is a diagram illustrating a cell used to measure a volume resistivity of a carrier.

The volume resistivity can be measured using a cell illustrated FIG. 3. Specifically, the cell includes a fluororesin container 2 in which electrodes 1*a* and 1*b* each having a surface area of 2.5 cm×4 cm are accommodated with a distance of 0.2 cm therebetween. The cell is filled with a carrier 3 and thereafter subjected to tapping 10 times under the condition that the falling height is 1 cm and the tapping speed is 30 times per minute. Next, a direct-current voltage of 1,000 V is applied to between the electrodes 1*a* and 1*b*, and 30 seconds later, a resistance value r (Ω) is measured using a HIGH RESISTANCE METER 4329A (manufactured by Yokogawa-Hewlett-Packard, Ltd.). The volume resistivity (Ω·cm) can be calculated from the following equation 1.

$$r\times(2.5\times4)/0.2 \qquad \text{Equation 1}$$

When the coating resin includes a silicone resin, an acrylic resin, or a combination thereof, film strength can be increased by cross-linking silanol groups by causing a condensation by a polycondensation catalyst.

Specific examples of the polycondensation catalyst include, but are not limited to, titanium-based catalysts, tin-based catalysts, zirconium-based catalysts, and aluminum-based catalysts. Among these various catalysts, titanium-based catalysts that provide excellent results are preferable, especially titanium diisopropoxybis (ethylacetoacetate) is particularly preferable. The reason for this is considered that this catalyst effectively accelerates condensation of silanol groups and is less likely to be deactivated.

A silane coupling agent may be used for the coating layer. Use of the silane coupling agent allows stable dispersion of chargeable inorganic fine particles.

The silane coupling agent is not particularly limited. Specific examples of the silane coupling agent include, but are not limited to, r-(2-aminoethyl)aminopropyltrimethoxysilane, r-(2-aminoethyl)aminopropylmethyldimethoxysilane, r-methacryloxypropyltrimethoxysilane, N-β-(N-vinylbenzylaminoethyl)-r-aminopropyltrimethoxysilane hydrochloride, r-glycidoxypropyltrimethoxysilane, r-mercaptopropyltrimethoxysilane, methyltrimethoxysilane, methyltriethoxysilane, vinyltriacetoxysilane, r-chloropropyltrimethoxysilane, hexamethyldisilazane, r-anilinopropyltrimethoxysilane, vinyltrimethoxysilane, octadecyldimethyl [3-(trimethoxysilyl)propyl]ammonium chloride, r-chloropropylmethyldimethoxysilane, methyltrichlorosilane, dimethyldichlorosilane, trimethylchlorosilane, allyltriethoxysilane, 3-aminopropylmethyldiethoxysilane, 3-aminopropyltrimethoxysilane, dimethyldiethoxysilane, 1,3-divinyltetramethyldisilazane, and methacryloxyethyldimethyl (3-trimethoxysilylpropyl)ammonium chloride. Two or more of these silane coupling agents may be used in combination.

Specific examples of commercially available silane coupling agents include, but are not limited to, AY43-059, SR6020, SZ6023, SH6026, SZ6032, SZ6050, AY43-310M, SZ6030, SH6040, AY43-026, AY43-031, sh6062, Z-6911, sz6300, sz6075, sz6079, sz6083, sz6070, sz6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, Z-6940 (manufactured by Dow Corning Toray Silicone Co. Ltd.).

Preferably, the proportion of the silane coupling agent to the silicone resin is 0.1% to 10% by mass. If the proportion of the silane coupling agent is 0.1% by mass or more, the adhesiveness between the core particles or conductive fine particles and the silicone resin can be prevented from lowering, and the coating layer can be prevented from falling off during long-term use. If the proportion of the silane coupling agent is 10% by mass or less, toner filming during long-term use can be prevented.

<Core Particle>

The core particles are not particularly limited as long as they are magnetic. Specific examples of the core particles include, but are not limited to, ferromagnetic metals such as iron and cobalt; iron oxides such as magnetite, hematite, and ferrite; various alloys and compounds; and resin particles obtained by dispersing these magnetic bodies in a resin. Among these materials, Mn ferrite, Mn—Mg ferrite, and Mn—Mg—Sr ferrite are preferred because they are environmentally-friendly.

The volume average particle diameter of the core particles is not particularly limited and can be selected as appropriate.

From the viewpoint of preventing carrier deposition and carrier scattering, the volume average particle diameter is preferably 20 μm or larger. From the viewpoint of preventing the occurrence of an abnormal image such as carrier streaks and preventing degradation of the image quality, the volume average particle diameter is preferably 100 μm or smaller. In particular, use of the core particles having a volume average particle diameter of 28 to 40 μm can more suitably respond to the recent trend of higher image quality.

(Developer)

The developer according to an embodiment of the present disclosure includes the carrier according to an embodiment of the present disclosure. The developer according to an embodiment of the present disclosure can be used for forming electrophotographic images, and a two-component developer according to an embodiment of the present disclosure includes the carrier and toner according to an embodiment of the present disclosure. Preferably, the toner is a negatively-chargeable toner.

The toner contains a binder resin and a colorant. The toner may be any of a monoclonal toner and a color toner. The toner particles may further contain a release agent so that the toner can be used in oilless fixing systems in which the fixing roller is free of application of toner adherence preventing oil. Such a toner is generally prone to filming, but the carriers according to an embodiment of the present disclosure can prevent filming, and thereby the developer according to an embodiment of the present disclosure can maintain good quality for a long period of time. Color toners, especially yellow toners generally have a problem that color staining occurs due to scraping of the carrier coating layer. The developer according to an embodiment of the present disclosure can prevent color staining.

The toner can be produced by known methods such as pulverization methods and polymerization methods. For example, when the toner is produced by a pulverization method, toner materials are first melt-kneaded, the melt-kneaded product is cooled and pulverized into particles, and the particles are classified by size, thus preparing base particles. To more improve transferability and durability, an external additive is added to the base particles, thus obtaining a toner.

The apparatus for kneading toner materials is not particularly limited. Specific examples of the apparatus include, but are not limited to, batch type two-roll extruder; Banbury mixers; continuous twin-screw extruders such as KTK twin-screw extruder (manufactured by Kobe Steel, Ltd.), TEM twin-screw extruder (manufactured by Toshiba Machine Co., Ltd.), a twin-screw extruder (manufactured by KCK engineering K.K.), PCM twin-screw extruder (manufactured by Ikegai Corp.), and KEX twin-screw extruder (manufactured by KURIMOTO, LTD.); continuous single-screw kneaders such as a co-kneader (manufactured by Buss AG).

When pulverizing the melt-kneaded product that has been cooled, the product can be coarsely pulverized using e.g. a hammer mill or a rotoplex, and then finely pulverized using e.g. a fine pulverizer using a jet stream, or a mechanical fine pulverizer. Preferably, the pulverization is performed such that the pulverized product has an average particle diameter of 3 to 15 μm.

To classify the pulverized melt-kneaded product by size, a wind-powered classifier can be used. Preferably, the classification is performed such that the resulting base particles have an average particle diameter of 5 to 20 μm.

The external additive is added to the base particles by being stir-mixed therewith using a mixer, so that the external additive gets adhered to the surfaces of the base particles while being pulverized.

The binder resin is not particularly limited and can be selected as appropriate from generally known binder resins. Specific examples of the binder resin include, but are not limited to, styrenes such as polystyrene, poly-p-styrene, and polyvinyl toluene, and a homopolymer of a substituent thereof; styrene-based copolymers such as a styrene-p-chlorostyrene copolymer, a styrene-propylene copolymer, a styrene-vinyltoluene copolymer, a styrene-methyl acrylate copolymer, a styrene-ethyl acrylate copolymer, a styrene-methacrylic acid copolymer, a styrene-methyl methacrylate copolymer, a styrene-ethyl methacrylate copolymer, a styrene-butyl methacrylate copolymer, a styrene-α-chloromethyl methacrylate copolymer, a styrene-acrylonitrile copolymer, a styrene-vinyl methyl ether copolymer, a styrene-vinyl methyl ketone copolymer, a styrene-butadiene copolymer, a styrene-isoprene copolymer, and a styrene-maleic acid ester copolymer; polymethyl methacrylate, polybutyl methacrylate, polyvinyl chloride, polyvinyl acetate, polyethylene, polyester, polyurethane, epoxy resins, polyvinyl butyral, polyacrylic acid, rosin, modified rosin, terpene resins, phenol resins, aliphatic or aromatic hydrocarbon resins, and aromatic petroleum resins. Two or more of these binder resins may be used in combination.

The binder resin for pressure fixation is not particularly limited, and can be selected as appropriate from generally known pressure fixation binder resins. Specific examples of the pressure fixation binder resin include, but are not limited to, polyolefins such as low molecular weight polyethylene and low molecular weight polypropylene; olefin copolymers such as an ethylene-acrylic acid copolymer, an ethylene-acrylic ester copolymer, a styrene-methacrylic acid copolymer, an ethylene-methacrylic ester copolymer, an ethylene-vinyl chloride copolymer, an ethylene-vinyl acetate copolymer, and an ionomer resin; epoxy resins, polyester, styrene-butadiene copolymers, polyvinylpyrrolidone, methyl vinyl ether-maleic anhydride copolymers, maleic acid-modified phenolic resins, and phenol-modified terpene resins. Two or more of these pressure fixation binder resins may be used in combination.

Colorants (pigments or dyes) are not particularly limited and may be selected as appropriate from generally known colorants. Specific examples of colorants include, but are not limited to: yellow pigments such as Cadmium Yellow, Mineral Fast Yellow, Nickel Titanium Yellow, Maples Yellow, Naphthol Yellow S, Hansa Yellow G, Hansa Yellow 10G, Benzidine Yellow GR, Quinoline Yellow Rake, Permanent Yellow NCG, and Tartrazine Rake; orange pigments such as Molybdenum Orange, Permanent Orange GTR, Pyrazolone Orange, Vulcan Orange, Indanthrene Brilliant Orange RK, Benzidine Orange G, and Indanthrene Brilliant Orange GK; red pigments such as red oxide, Cadmium Red, Permanent Red 4R, Lithol Red, Pyrazolone Red, Watching Red Calcium Salt, Rake Red D, Brilliant Carmine 6B, Eosin Rake, Rhodamine Rake B, Alizarin Rake, and Brilliant Carmine 3B; purple pigments such as Fast Violet B, and Methyl Violet Rake; blue pigments such as Cobalt Blue, Alkali Blue, Victoria Blue Rake, Phthalocyanine Blue, Metal-Free Phthalocyanine Blue, Phthalocyanine Blue Partial Chloride, Fast Sky Blue, and Indanthrene Blue BC; green pigments such as Chrome Green, Chromium Oxide, Pigment Green B, and Malachite Green Rake; and black pigments such as Carbon Black, Oil Furnace Black, Channel Black, Lamp Black, Acetylene Black, an azine-based pigment e.g. Aniline Black, a metal salt azo pigment, a metal oxide, and a complex metal oxide. Two or more of these colorants may be used in combination.

The release agent is not particularly limited and may be selected as appropriate from generally known release agents. Specific examples of the release agent include, but are not limited to, polyolefins such as polyethylene and polypropylene, fatty acid metal salts, fatty acid esters, paraffin waxes, amide-based waxes, polyalcohol waxes, silicone varnishes, carnauba waxes, and ester waxes. Two or more of these release agents may be used in combination.

The toner may further contain a charge control agent. The charge control agent is not limited and may be selected from generally known charge control agents. Specific examples of the charge control agent include, but are not limited to: nigrosine; azine dyes with an alkyl group having 2 to 16 carbon atoms; basic dyes such as Color Index (C.I.) Basic Yellow 2 (C.I. 41000), C.I. Basic Yellow 3, C.I. Basic Red 1 (C.I. 45160), C.I. Basic Red 9 (C.I. 42500), C.I. Basic Violet 1 (C.I. 42535), C.I. Basic Violet 3 (C.I. 42555), C.I. Basic Violet 10 (C.I. 45170), C.I. Basic Violet 14 (C.I. 42510), C.I. Basic Blue 1 (C.I. 42025), C.I. Basic Blue 3 (C.I. 51005), C.I. Basic Blue 5 (C.I. 42140), C.I. Basic Blue 7 (C.I. 42595), C.I. Basic Blue 9 (C.I. 52015), C.I. Basic Blue 24 (C.I. 52030), C.I. Basic Blue 25 (C.I. 52025), C.I. Basic Blue 26 (C.I. 44045), C.I. Basic Green 1 (C.I. 42040), and C.I. Basic Green 4 (C.I. 42000); rake pigments of these basic dyes; quaternary ammonium salts such as C.I. Solvent Black 8 (C.I. 26150), benzoyl methylhexadecyl ammonium chloride and decyltrimethyl chloride; dialkyltin compounds such as dibutyltin and dioctyltin; dialkyltin borate compounds; guanidine derivatives; polyamine resins such as vinyl-based polymers having amino groups and condensed polymers having amino groups; metal complex salts of monoazo dyes; salicylic acids; metal complexes of dialkyl salicylic acids, naphthoic acids, or dicarboxylic acids with Zn, Al, Co, Cr, or Fe; sulfonated copper phthalocyanine pigments; organoboron salts; fluorine-containing quaternary ammonium salts; and calixarene-based compounds. Two or more of these charge control agents may be used in combination. For color toners other than black toner, e.g. metal salts of salicylic acid derivatives, which are white, are preferable.

The external additive is not particularly limited, and may be selected as appropriate from generally known external additives. Specific examples of the external additive include, but are not limited to, inorganic particles such as silica, titanium oxide, alumina, silicon carbide, silicon nitride, and boron nitride; resin particles such as polymethyl methacrylate particles having an average particle diameter of 0.05 to 1 μm obtained by a soap-free emulsion polymerization method, and polystylene particles. Two or more of these external additives may be used in combination. Among these, metal oxide particles such as silica and titanium oxide, whose surfaces are hydrophobized are preferable.

When a hydrophobized silica and a hydrophobized titanium oxide are used in combination with the amount of the hydrophobized titanium oxide greater than that of the hydrophobized silica, the toner provides excellent charge stability against humidity.

The carrier according to an embodiment of the present disclosure is used for a replenishment developer containing the carrier and the toner, and applied to an image forming apparatus that forms images while emitting excess developer in the developing device, so that stable image quality can be obtained for an extremely long period of time This is because the deteriorated carrier particles in the developing device are replaced with non-deteriorated carrier particles contained in the developer for replenishment. Thus, the charge amount is kept constant and images are reliably produced for a long period of time. This method is particularly effective when a manuscript with a large printed area (also referred to as a high image area) is printed. In printing the high image area, a main carrier deterioration is a carrier charge deterioration due to toner spending on the carrier. Using this method in printing the high image area, the amount of the replenished carrier is increased, and thereby the deteriorated carrier is frequently replaced. Accordingly, high image quality is reliably provided for an extremely long period of time.

A mixing ratio of the toner in the replenishment developer is preferably 2 parts by mass or higher and 50 parts by mass or lower based on 1 part by mass of the carrier. If the ratio of the toner is 2 parts by mass or higher, the carrier supply will not be excessive and the carrier concentration in the developing device will not become too high, thus the charge amount of the developer is less likely to increase. As the charge amount of the developer increases, the developing potential may decrease and the image density may decrease. If the ratio of the toner is 50 parts by mass or less, the ratio of the carrier in the replenishment developer will not decrease, and therefore the carrier in the image forming apparatus is frequently replaced, and the effect on the carrier deterioration can be expected.

As for the two-component developer, the concentration of the toner in the developer is preferably within a range of 4% by mass or higher and 9% by mass or lower. If the toner concentration is 4% by mass or more, the amount of the toner is large, and an appropriate image density can be obtained. If the toner concentration is 9% by mass or less, it is easy for the carrier to hold the toner, and toner scattering is less likely to occur.

(Image Forming Method)

In the image forming method according to an embodiment of the present disclosure, the developer according to an embodiment of the present disclosure is used. The image forming method according to an embodiment of the present disclosure includes a processes in which an electrostatic latent image is formed on an electrostatic latent image bearer; a process in which the electrostatic latent image formed on the electrostatic latent image bearer is developed using the two-component developer according to an embodiment of the present disclosure to form a toner image; a process in which the toner image formed on the electrostatic latent image bearer is transferred to a recording medium; and a process in which the toner image transferred to the recording medium is fixed to the recording medium. As the developer, the developer according to an embodiment of the present disclosure e.g. the two-component developer is used.

(Process Cartridge)

The process cartridge according to an embodiment of the present disclosure includes the developer according to an embodiment of the present disclosure. The process cartridge according to an embodiment of the present disclosure includes e.g. an electrostatic latent image bearer, a charging device that charges the surface of the electrostatic latent image bearer, a developing device that develops the electrostatic latent image formed on the electrostatic latent image bearer using the two-component developer according to an embodiment of the present disclosure, and a cleaning device that cleans the electrostatic latent image bearer.

As the developer, the developer according to an embodiment of the present disclosure e.g. the two-component developer is used.

Figure 4:
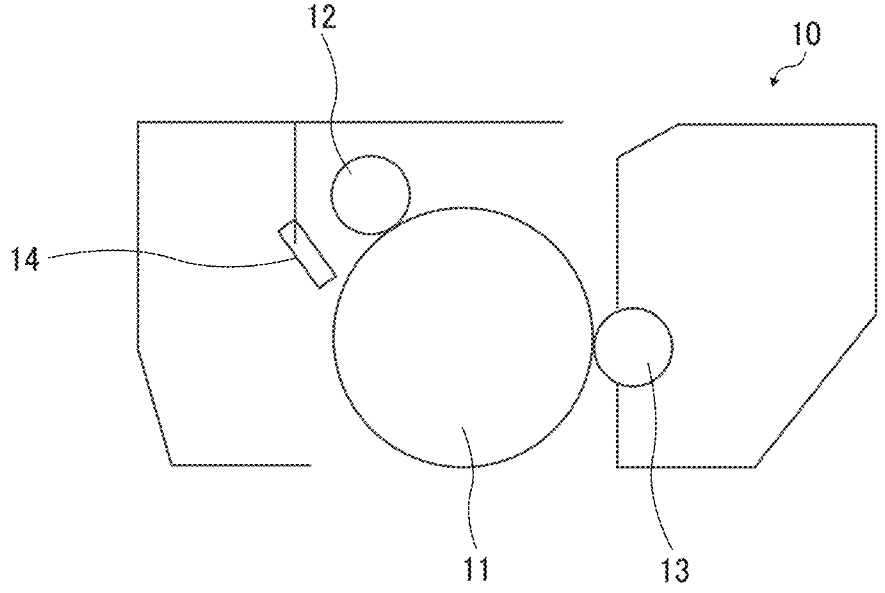
FIG. 4 is a diagram illustrating an example of a process cartridge according to an embodiment of the present disclosure.

FIG. 4 is a diagram illustrating an example of the process cartridge according to an embodiment of the present disclosure. A process cartridge 10 is integrally supported by a photoconductor 11, a charging device 12, a developing device 13, and a cleaning device 14. The photoconductor 11 is an electrostatic latent image bearer. The charging device 12 charges the photoconductor 11. The developing device 13 develops the electrostatic latent image formed on the photoconductor 11 using the developer according to an embodiment of the present disclosure to form a toner image. The cleaning device 14 removes residual toner on the photoconductor 11 after the toner image formed on the photoconductor 11 is transferred to a recording medium. The process cartridge 10 can be attached to and detached from the main body of the image forming apparatus such as a copier and a printer.

A method for forming images using an image forming apparatus equipped with the process cartridge 10 will be explained below. First, the photoconductor 11 is driven to rotate at a predetermined peripheral velocity, and the peripheral surface of the photoconductor 11 is uniformly charged to a predetermined positive or negative potential by the charging device 12. Next, the peripheral surface of the photoconductor 11 is irradiated with exposure light from an irradiator such as a slit exposure type irradiator and a laser beam scanning exposure irradiator to sequentially form electrostatic latent images. Furthermore, the electrostatic latent images formed on the peripheral surface of the photoconductor 11 are developed by the developing device 13 using the developer according to an embodiment of the present disclosure to form toner images. Next, the toner images formed on the peripheral surface of the photoconductor 11 are sequentially transferred to a transfer sheet fed from a paper feeder to between the photoconductor 11 and the transferring device in synchronization with the rotation of the photoconductor 11. The transfer sheet on which the toner image has been transferred is separated from the peripheral surface of the photoconductor 11 and introduced into a fixing device to be fixed, and then output as a duplicate (copy) out of the image forming apparatus. On the other hand, the surface of the photoconductor 11 on which the toner image has been transferred is cleaned by removing the residual toner by the cleaning device 14, and then destaticized by a destaticizing device, so that the photoconductor 11 is repeatedly used for image formation.

(Image Forming Apparatus)

The image forming apparatus according to an embodiment of the present disclosure includes the developer according to an embodiment of the present disclosure. The image forming apparatus according to an embodiment of the present disclosure includes e.g. an electrostatic latent image bearer, a charging device that charges the electrostatic latent image bearer, an irradiating device that forms an electrostatic latent image on the electrostatic latent image bearer, a developing device that develops the electrostatic latent image formed on the electrostatic latent image bearer using a developer to form a toner image, a transferring device that transfers the toner image formed on the electrostatic latent image bearer to a recording medium, and a fixing device that fixes the toner image transferred to the recording medium. Furthermore, the image forming apparatus optionally includes other devices selected as appropriate, such as a destaticizing device, a cleaning device, a recycling device, and a control device. As the developer, the developer according to an embodiment of the present disclosure e.g. the two-component developer is used.

EXAMPLES

Further understanding can be obtained by reference to certain specific examples which are provided herein for the purpose of illustration only and are not intended to be limiting. Unless otherwise noted, "part" in the following descriptions represents "parts by mass", and "%" represents "% by mass" or "area ratio".

Production Example 1

<Composition of Resin Liquid 1>

- Acrylic resin solution (solid content concentration: 20%): 200 parts
- Silicone resin solution (solid content concentration: 40%): 2,000 parts
- Amino silane (solid content concentration: 100%): 20 parts
- Tungsten oxide-doped tin oxide (WTO) surface-treated alumina: 1160 parts (powder resistivity: 40 [Ω·cm])
- Barium sulfate: 880 parts (circle-equivalent diameter: 0.60 [μm])
- Toluene: 6,800 parts
- Dispersing agent (phosphate-based surfactant): 40 parts
- Defoaming agent (silicone-based): 290 parts The aforementioned materials were dispersed by a homomixer for 10 minutes to formulate a [resin liquid 1] as a coating layer forming liquid (resin layer forming liquid). Mn ferrite having a volume average particle diameter of 36.5 μm was used as the core particles of the carrier. The [resin liquid 1] was applied on the surface of the core material so as to have a thickness of 0.35 μm using SPIRA COTA SP-40 (manufactured by OKADA SEIKO CO., LTD.) at a rate of 30 g/min under an atmosphere of 60° C., and then dried. The resulted carrier was allowed to be burnt in an electric furnace at 230° C. for 1 hour, then cooled, and pulverized with a sieve having an opening of 100 μm. Thus, a [carrier 1] was prepared. The coating resin (resin portion) of the [carrier 1] had an average film thickness (average thickness) T of 0.35 μm. The coating layer had a porosity of 1.3%.

The measurement will be explained.

A volume average particle diameter of the core particles was measured using an SRA MICROTRAC particle size analyzer (manufactured by NIKKISO CO., LTD.) in a range set to 0.7 μm or larger and 125 μm or smaller.

The porosity of the coating layer and the average film thickness (average thickness) of the coating resin were confirmed by cutting the carrier using an ion milling and observing the cross section by SEM.

The measurement will be explained in detail. The carrier was mixed with the embedding resin (EPOFIX manufactured by Struers, two-component and 12-hour-curing epoxy resin) and allowed to stand overnight or longer to be cured, and a rough cross-sectional sample was prepared by a cutter. The cross section of the cross-sectional sample was finished using an ion milling (IM4000PLUS manufactured by Hitachi High-Technologies) under a condition of an acceleration voltage: 4.5 kV and a processing time: 5 hours. This cross section was photographed using a scanning electron microscope (MERLIN manufactured by Carl Zeiss AG) under a condition of an acceleration voltage: 2.0 kV and a magnification: 10 k times. The photographed image was captured as a Tag Image File Format (TIFF) image, and the porosity of the coating layer and the average film thickness (average thickness) of the coating resin were calculated using IMAGE-PRO PLUS manufactured by Media Cybernetics, Inc.

In a condition that, on the cross section of the coating layer, the cross sectional area of the voids was defined as S1, the cross sectional area of the resin portion was defined as S2, the porosity was calculated in accordance with the following equation.

$$\text{Porosity } [\%]=S1/S2\times 100$$

In a condition that, on the cross section of the coating layer, a cross sectional area of the resin portion was defined as S2 and an outer circumferential length of the carrier was defined as L, the average film thickness (average thickness) was calculated according to the following equation.

$$\text{Average film thickness } [\mu\text{m}]=S2/L$$

In a condition that, on the cross section of the coating layer, the cross sectional area of the entire coating layer was defined as S3 and the sum of the cross sectional areas of the conductive component and the chargeable inorganic fine particles in the resin layer was defined as S4, the cross sectional area S2 of the resin portion was calculated as follows.

$$S2=S3-S1-S4$$

The circle-equivalent diameter of the chargeable inorganic fine particles can be confirmed by cutting the carrier using an ion milling and observing the cross section by the cross-sectional SEM and EDX.

The measurement will be explained in detail. The carrier was mixed with the embedding resin (EPOFIX manufactured by Struers, two-component and 12-hour-curing epoxy resin) and allowed to stand overnight or longer to be cured, and a rough cross-sectional sample was prepared by a cutter. The cross section of the cross-sectional sample was finished using an ion milling (IM4000PLUS manufactured by Hitachi High-Technologies) under a condition of an acceleration voltage: 4.5 kV and a processing time: 5 hours. This cross section was photographed using a scanning electron microscope (MERLIN manufactured by Carl Zeiss AG) under a condition of an acceleration voltage: 0.8 kV and a magnification: 10 k times. The photographed image was captured as a TIFF image, the circle-equivalent diameters of 100 chargeable inorganic fine particles were measured using IMAGE-PRO PLUS manufactured by Media Cybernetics, Inc., and an average diameter was determined.

An amount of barium exposed to the surface of the coating layer can be detected in atomic % of barium calculated by a peak analysis using AXIS/ULTRA (manufactured by Shimadzu Corporation/KRATOS). The beam irradiation area of the apparatus was about 900 μm×600 μm, and the barium exposure amount was detected in an area range including 25×17 carriers. A penetration depth of the beam was 0 to 10 nm, and the apparatus detected information in the vicinity of the surface layer of the carrier. For specific example, the measurement method was executed under a condition of measurement mode: Al:1486.6 eV, excitation source: monochrome (Al), detection mode: spectral mode, and magnet lens: OFF. First, the detected elements are identified by a wide scan, and then a peak for each detected element was detected by a narrow scan. Next, each atomic % of barium to all detected elements was calculated using an attached peak analysis software.

Production Example 2

A [carrier 2] was prepared in the same manner as in Production Example 1 except that the [resin liquid 1] was applied on the surface of the core material so as to have a thickness of 0.12 μm using SPIRA COTA SP-40.

Production Example 3

A [carrier 3] was prepared in the same manner as in Production Example 1 except that the [resin liquid 1] was applied on the surface of the core material so as to have a thickness of 0.44 μm using SPIRA COTA SP-40.

Production Example 4

A [carrier 4] was prepared in the same manner as in Production Example 1 except that the barium sulfate was replaced with magnesium oxide (circle-equivalent diameter: 0.55 μm).

Production Example 5

A [carrier 5] was prepared in the same manner as in Production Example 1 except that the barium sulfate was replaced with magnesium hydroxide (circle-equivalent diameter: 0.61 μm).

Production Example 6

A [carrier 6] was prepared in the same manner as in Production Example 1 except that the barium sulfate was replaced with hydrotalcite (circle-equivalent diameter: 0.58 μm).

Production Example 7

<Resin Liquid 7>

- Acrylic resin solution (solid content concentration: 20%): 200 parts
- Silicone resin solution (solid content concentration: 40%): 2,000 parts
- Amino silane (solid content concentration: 100%): 20 parts Tungsten oxide-doped tin oxide (WTO) surface-treated alumina: 1160 parts (powder resistivity: 40 [Ω·cm])
Barium sulfate: 220 parts (circle-equivalent diameter: 0.60 [μm])
Toluene: 6,800 parts
Dispersing agent (phosphate-based surfactant): 30 parts
Defoaming agent (silicone-based): 270 parts A [carrier 7] was prepared in the same manner as in Production Example 1 except that the [resin liquid 1] was replaced with the [resin liquid 7].

Production Example 8

<Resin Liquid 8>
Acrylic resin solution (solid content concentration: 20%): 200 parts
Silicone resin solution (solid content concentration: 40%): 2,000 parts
Amino silane (solid content concentration: 100%): 20 parts
Tungsten oxide-doped tin oxide (WTO) surface-treated alumina: 1160 parts (powder resistivity: 40 [Ω·cm])
Barium sulfate: 220 parts (circle-equivalent diameter: 0.60 [μm])
Toluene: 6,800 parts
Dispersing agent (phosphate-based surfactant): 30 parts
Defoaming agent (silicone-based): 580 parts A [carrier 8] was prepared in the same manner as in Production Example 1 except that the [resin liquid 1] was replaced with the [resin liquid 8]. The coating layer of the [carrier 8] had a porosity of 0.3%.

Production Example 9

<Resin Liquid 9>
Acrylic resin solution (solid content concentration: 20%): 200 parts
Silicone resin solution (solid content concentration: 40%): 2,000 parts
Amino silane (solid content concentration: 100%): 20 parts
Tungsten oxide-doped tin oxide (WTO) surface-treated alumina: 1160 parts (powder resistivity: 40 [Ω·cm])
Barium sulfate: 220 parts (circle-equivalent diameter: 0.60 [μm])
Toluene: 6,800 parts
Dispersing agent (phosphate-based surfactant): 30 parts
Defoaming agent (silicone-based): 110 parts A [carrier 9] was prepared in the same manner as in Production Example 1 except that the [resin liquid 1] was replaced with the [resin liquid 9]. The coating layer of the [carrier 9] had a porosity of 2.7%.

Comparative Production Example 1

A [carrier 10] was prepared in the same manner as in Production Example 1 except that the [resin liquid 1] was applied on the surface of the core material so as to have a thickness of 0.50 μm using SPIRA COTA SP-40.

Comparative Production Example 2

A [carrier 11] was prepared in the same manner as in Production Example 1 except that the [resin liquid 1] was applied on the surface of the core material so as to have a thickness of 0.08 μm using SPIRA COTA SP-40.

Comparative Production Example 3

<Resin Liquid 12>
Acrylic resin solution (solid content concentration: 20%): 200 parts
Silicone resin solution (solid content concentration: 40%): 2,000 parts
Amino silane (solid content concentration: 100%): 20 parts
Tungsten oxide-doped tin oxide (WTO) surface-treated alumina: 1160 parts (powder resistivity: 40 [Ω·cm])
Toluene: 6,800 parts
Dispersing agent (phosphate-based surfactant): 30 parts
Defoaming agent (silicone-based): 110 parts A [carrier 12] was prepared in the same manner as in Production Example 1 except that the [resin liquid 1] was replaced with the [resin liquid 12].

Comparative Production Example 4

<Resin Liquid 13>
Acrylic resin solution (solid content concentration: 20%): 200 parts
Silicone resin solution (solid content concentration: 40%): 2,000 parts
Amino silane (solid content concentration: 100%): 20 parts
Tungsten oxide-doped tin oxide (WTO) surface-treated alumina: 1160 parts (powder resistivity: 40 [Ω·cm])
Barium sulfate: 220 parts (circle-equivalent diameter: 0.60 [μm])
Toluene: 6,800 parts
Dispersing agent (phosphate-based surfactant): 30 parts
Defoaming agent (silicone-based): 580 parts The aforementioned materials were dispersed by a homomixer for 10 minutes to formulate [resin liquid 13] as a coating layer forming liquid. The [resin liquid 13] was degassed to remove dissolved gases. A Mn ferrite having a volume average particle diameter of 36.5 μm was used as the core particles of the carrier. The [resin liquid 13] was applied on the surface of the core material so as to have a thickness of 0.35 μm using SPIRA COTA SP-40 (manufactured by OKADA SEIKO CO., LTD.) at a rate of 30 g/min under an atmosphere of 60° C., and then dried. A [carrier 13] was prepared in the same manner as in Production Example 1 except for the above process. The coating layer of the [carrier 13] had a porosity of 0.05%.

Comparative Production Example 5

<Resin Liquid 14>
Acrylic resin solution (solid content concentration: 20%): 200 parts
Silicone resin solution (solid content concentration: 40%): 2,000 parts
Amino silane (solid content concentration: 100%): 20 parts
Tungsten oxide-doped tin oxide (WTO) surface-treated alumina: 1160 parts (powder resistivity: 40 [Ω·cm])
Barium sulfate: 220 parts (circle-equivalent diameter: 0.60 [μm])
Toluene: 6,800 parts
Dispersing agent (phosphate-based surfactant): 30 parts A [carrier 14] was prepared in the same manner as in Production Example 1 except that the [resin liquid 1] was replaced with the [resin liquid 14]. The coating layer of the [carrier 14] had a porosity of 7.0%.

Properties of the above-prepared carrier are presented in Table 1.

TABLE 1

| | | | Chargeable inorganic fine particle | | | Defoaming agent | |
|---|---|---|---|---|---|---|---|
| | Carrier | Average film thickness T (μm) | Type | Formulation amount (parts by mass) | Porosity (%) | Formulation amount (parts by mass) | Barium exposure amount (atomic %) |
| Example 1 | 1 | 0.35 | Barium sulfate | 880 | 1.3 | 290 | 0.6 |
| Example 2 | 2 | 0.12 | Barium sulfate | 880 | 1.4 | 290 | 0.7 |
| Example 3 | 3 | 0.44 | Barium sulfate | 880 | 1.4 | 290 | 0.6 |
| Example 4 | 4 | 0.35 | Magnesium oxide | 880 | 1.3 | 290 | 0 |
| Example 5 | 5 | 0.35 | Magnesium hydroxide | 880 | 1.2 | 290 | 0 |
| Example 6 | 6 | 0.35 | Hydrotalcite | 880 | 1.4 | 290 | 0 |
| Example 7 | 7 | 0.35 | Barium sulfate | 220 | 1.3 | 270 | 0.6 |
| Example 8 | 8 | 0.35 | Barium sulfate | 880 | 0.3 | 580 | 0.6 |
| Example 9 | 9 | 0.35 | Barium sulfate | 880 | 2.7 | 110 | 0.6 |
| Comparative Example 1 | 10 | 0.50 | Barium sulfate | 880 | 1.2 | 290 | 0.5 |
| Comparative Example 2 | 11 | 0.08 | Barium sulfate | 880 | 1.2 | 290 | 0.7 |
| Comparative Example 3 | 12 | 0.35 | — | 0 | 1.4 | 290 | 0 |
| Comparative Example 4 | 13 | 0.35 | Barium sulfate | 880 | 0.05 | 580 | 0.6 |
| Comparative Example 5 | 14 | 0.35 | Barium sulfate | 880 | 7.0 | 0 | 0.6 |

Toner Production Example

The toner was produced as follows.

<Synthesis of Polyester Resin A>

In a reaction vessel equipped with a condenser tube, a stirrer, and a nitrogen introducing tube, 65 parts of ethylene oxide 2-mol adduct of bisphenol A, 86 parts of propylene oxide 3-mol adduct of bisphenol A, 274 parts of terephthalic acid, and 2 parts of dibutyltin oxide were put and allowed to react at 230° C. under normal pressure for 15 hours. The reaction was further continued under reduced pressures of 5 to 10 mmHg for 6 hours. Thus, a [polyester resin A] was synthesized. The resulted [polyester resin A] was found to have a number average molecular weight (Mn) of 2,300, a weight average molecular weight (Mw) of 8,000, a glass transition temperature (Tg) of 58° C., an acid value of 25 mgKOH/g, and a hydroxyl value of 35 mgKOH/g.

<Synthesis of Prepolymer (Polymer Reactive with Compound Having Active Hydrogen Group)>

In a reaction vessel equipped with a condenser tube, a stirrer, and a nitrogen introducing tube, 682 parts of ethylene oxide 2-mol adduct of bisphenol A, 81 parts of propylene oxide 2-mol adduct of bisphenol A, 283 parts of terephthalic acid, 22 parts of trimellitic anhydride, and 2 parts of dibutyltin oxide were put and allowed to react at 230° C. under normal pressure for 8 hours. Subsequently, the reaction was further continued under reduced pressures of 10 to 15 mHg for 5 hours. Thus, an [intermediate polyester] was synthesized.

The resulted [intermediate polyester] was found to have a number average molecular weight (Mn) of 2,100, a weight average molecular weight (Mw) of 9,600, a glass transition temperature (Tg) of 55° C., an acid value of 0.5, and a hydroxyl value of 49.

Subsequently, in a reaction vessel equipped with a condenser tube, a stirrer, and a nitrogen introducing tube, 411 parts of the [intermediate polyester], 89 parts of isophorone diisocyanate, and 500 parts of ethyl acetate were put, and allowed to react at 100° C. for 5 hours. Thus, a [prepolymer] (polymer reactive with the aforementioned active hydrogen group-containing compound) was synthesized.

The proportion of free isocyanate in the resulted [prepolymer] was 1.60% by mass. The solid content concentration of the [prepolymer] was 50% by mass (when measured at 150° C. after leaving the prepolymer to stand for 45 minutes).

<Synthesis of Ketimine (the Active Hydrogen Group-Containing Compound)>

In a reaction vessel equipped with a stirring rod and a thermometer, 30 parts of isophoronediamine and 70 parts of methyl ethyl ketone were put, and allowed to react at 50° C. for 5 hours. Thus, a [Ketimine] (the aforementioned active hydrogen group-containing compound) was synthesized. The resulted [ketimine] (the aforementioned active hydrogen group-containing compound) was found to have an amine value of 423.

<Preparation of Master Batch>

First, 1,000 parts of water, 540 parts of a carbon black PRINTEX 35 (manufactured by Degussa AG) having a dibutyl phthalate (DBP) oil absorption amount of 42 mL/100 g and a pH of 9.5, and 1,200 parts of the polyester resin A were mixed with a HENSCHEL MIXER (manufactured by Mitsui Mining Co., Ltd.). Next, the resulted mixture was kneaded by a two-roll extruder at 150° C. for 30 minutes, cooled by rolling, and pulverized by a pulverizer (manufactured by Hosokawa Micron Corporation). Thus, a [master batch] was prepared.

<Preparation of Aqueous Medium>

An aqueous medium was prepared by dissolving 265 parts of a 10% by mass suspension of tricalcium phosphate and 1.0 part of sodium dodecylbenzene sulfonate in 306 parts of ion-exchange water and by uniformly mixing and stirring them.

<Measurement of Critical Micelle Concentration>

A critical micelle concentration of a surfactant was measured in the following manner. An analysis was performed using an analysis program installed in the system of a surface tensiometer SIGMA (manufactured by KSV Instruments Ltd.). A surfactant was dropped in an aqueous medium with each drop having a proportion of 0.01% to the aqueous medium. After the aqueous medium had been stirred and allowed to stand, an interfacial tension was measured. From a resulted surface tension curve, a surfactant concentration at which the interfacial tension did not decrease even when the surfactant was further dropped was calculated as the critical micelle concentration. The critical micelle concentration of sodium dodecylbenzene sulfonate with respect to the aqueous medium, measured using the surface tensiometer SIGMA, was 0.05% with respect to the mass of the aqueous medium.

<Preparation of Toner Material Liquid>

In a beaker, 70 parts of the [polyester resin A] and 10 parts of the [prepolymer] were dissolved in 100 parts of ethyl acetate by stirring. To this solution, 5 parts of paraffin wax (HNP-9 manufactured by NIPPON SEIRO CO., LTD, melting point: 75° C.) as a release agent, 2 parts of MEK-ST (manufactured by Nissan Chemical Corporation), and 10 parts of the [master batch] were added. The mixture was filled with 80% by volume of zirconia beads having a particle diameter of 0.5 mm using a bead mill ULTRA VISCO MILL (manufactured by AIMEX CO., Ltd.) at a feed rate of 1 kg/hour and a disk peripheral velocity of 6 m/second. In this condition, the mixture was passed three times through the bead mill, and then 2.7 parts of the [ketimine] was added and dissolved into the mixture. Thus, a toner material liquid was prepared.

<Preparation of Emulsion or Liquid Dispersion>

In a vessel, 150 parts of the aqueous medium was stirred by TK HOMOMIXER (manufactured by Tokushu Kika Kogyo Co., Ltd.) at a revolution of 12,000 rpm, and 100 parts of the toner material liquid were added thereto and mixed for 10 minutes. Thus, an emulsion or liquid dispersion (emulsion slurry) was prepared.

<Removal of Organic Solvent>

In a flask equipped with a stirrer and a thermometer, 100 parts of the emulsion slurry was placed and stirred at a stirring peripheral speed of 20 m/min at 30° C. for 12 hours to remove the solvent. Thus, a dispersion slurry was prepared.

<Washing>

First, 100 parts of the dispersion slurry were filtered under reduced pressures. The resulted filter cake was mixed with 100 parts of ion-exchange water by TK HOMOMIXER (at a revolution of 12,000 rpm for 10 minutes) and then filtered. The resulted filter cake was mixed with 300 parts of ion-exchange water by TK HOMOMIXER (at a revolution of 12,000 rpm for 10 minutes), and then filtered. This manipulation was conducted twice. The resulted filter cake was mixed with 20 parts of a 10% by mass aqueous solution of sodium hydroxide by a TK HOMOMIXER (at a revolution of 12,000 rpm for 30 minutes) and then filtered under reduced pressures. The resulted filter cake was mixed with 300 parts of ion-exchange water by a TK HOMOMIXER (at a revolution of 12,000 rpm for 10 minutes) and then filtered. The resulted filter cake was mixed with 300 parts of ion-exchange water by TK HOMOMIXER (at a revolution of 12,000 rpm for 10 minutes), and then filtered. This manipulation was conducted twice. Furthermore, the resulted filter cake was mixed with 20 parts of a 10% by mass aqueous solution of hydrochloric acid by a TK HOMOMIXER (at a revolution of 12,000 rpm for 10 minutes) and then filtered.

<Adjustment of Amount of Surfactant>

The filter cake prepared in the above washing process was mixed with 300 parts of ion-exchange water by a TK HOMOMIXER (at a revolution of 12,000 rpm for 10 minutes) to prepare a toner liquid dispersion. The electrical conductivity of this toner liquid dispersion was measured, and the surfactant concentration in the toner liquid dispersion was calculated with reference to the surfactant concentration calibration curve created in advance. The toner liquid dispersion was further added with ion-exchange water so that the calculated surfactant concentration became the target surfactant concentration of 0.05%.

<Surface Treatment Process>

The toner liquid dispersion adjusted to have the specified surfactant concentration was heated in a water bath at a heating temperature T1 of 55° C. for 10 hours while being stirred at 5,000 rpm by TK HOMOMIXER. The toner liquid dispersion was thereafter cooled to 25° C. and then filtered. The resulted filter cake was mixed with 300 parts of ion-exchange water by TK HOMOMIXER (at a revolution of 12,000 rpm for 10 minutes) and then filtered.

<Drying>

The resulted final filter cake was dried by a circulating air dryer at 45° C. for 48 hours and then filtered with a mesh having an opening of 75 μm. Thus, [toner base particles 1] were prepared.

<External Addition Treatment>

Furthermore, 100 parts of the [toner base particles 1] were mixed with 3.0 parts of a hydrophobic silica having an average particle diameter of 100 nm, 1.0 part of a titanium oxide having an average particle diameter of 20 nm, and 1.5 parts of a hydrophobic silica fine powder having an average particle diameter of 15 nm using a HENSCHEL MIXER. Thus, a [toner 1] was prepared.

(Preparation of Developer)

Each of the [carrier 1] to [carrier 14] (93 parts) and the toner 1 (7 parts) obtained in Examples and Comparative Examples were mixed and stirred in a turbular mixer at 81 rpm for 3 minutes. Thus, [developer 1] to [developer 14] for evaluation were prepared. Further, developers for replenishment corresponding to these developers were prepared using each carrier and the toner such that the toner concentration became 95%.

(Evaluations)

The resulted [developer 1] to [developer 14] were subjected to the following evaluations.

To evaluate the property of imparting charge to the toner, the time-dependent charge stability and the toner scattering were evaluated. The digital full-color multifunction peripheral used for the evaluation (PRO C9100 manufactured by RICOH COMPANY, LTD.) is a color production printer. Also for a high-speed printer using a low-temperature fixing toner, continuous paper feeding with a print density at low image area ratio was evaluated in accordance with the following evaluation criteria.

<Time-Dependent Charge Stability>

In PRO C9100 (digital color copier/printer multifunction peripheral) manufactured by RICOH COMPANY, LTD., the time-dependent charge stability was evaluated for each carrier after a running test on 1,000,000 sheets with image area ratio of 40% using [developer 1] to [developer 14] in Examples and Comparative Examples and replenishment developers corresponding to these developers.

First, the initial charge amount (Q1) of the carrier was measured by a process in which each of the [carrier 1] to [carrier 14] and the [toner 1] were mixed in a mass ratio of 93:7, the mixture was frictionally charged to prepare a sample, and the sample was subjected to the measurement using a blow off device TB-200 (manufactured by Toshiba Chemical Corporation). A charge amount (Q2) of each carrier after the running test on 1,000,000 sheets was measured in the same manner as above process except that the carrier in which the respective color toners were removed from the developer after the running test by the blow off device was used. A rate of change in the charge amount was defined as an absolute value of (Q1−Q2)/(Q1)×100. The evaluation criteria are as follows.

[Evaluation Criteria]

0 or higher and lower than 5: Excellent
5 or higher and lower than 10: Good
10 or higher and lower than 20: Available
20 or higher: Unavailable <Toner Scattering>

In PRO C9100 (digital color copier/printer multifunction peripheral) manufactured by RICOH COMPANY, LTD., after running output of 1,000,000 manuscripts with a printed portion area ratio of 40% (image area ratio of 40%) using [developer 1] to [developer 14] in Examples and Comparative Examples and replenishment developers corresponding to these developers, the toner accumulated in the lower part of the developer bearer was sucked and collected, and a mass of the toner was measured. The evaluation criteria are as follows.

[Evaluation Criteria]

0 mg or more and lower than 50 mg: Excellent
50 mg or more and lower than 100 mg: Good
100 mg or more and lower than 250 mg: Available
250 mg or more: Unavailable The evaluation results are presented in Table 2.

TABLE 2

| | Carrier | Time-dependent charge stability | Toner scattering |
|---|---|---|---|
| Example 1 | 1 | Excellent | Excellent |
| Example 2 | 2 | Available | Good |
| Example 3 | 3 | Good | Good |
| Example 4 | 4 | Good | Good |
| Example 5 | 5 | Good | Good |
| Example 6 | 6 | Good | Good |
| Example 7 | 7 | Available | Available |
| Example 8 | 8 | Available | Good |
| Example 9 | 9 | Good | Available |
| Comparative Example 1 | 10 | Unavailable | Available |
| Comparative Example 2 | 11 | Unavailable | Unavailable |
| Comparative Example 3 | 12 | Unavailable | Available |
| Comparative Example 4 | 13 | Unavailable | Available |
| Comparative Example 5 | 14 | Available | Unavailable |

Embodiments of the present disclosure provide, for example, the following items <1> to <8>.

<1> A carrier including a core particle and a coating layer coating the core particle, in which the coating layer includes a resin and chargeable inorganic fine particles, the coating layer has voids, the resin has an average film thickness of 0.10 μm or larger and smaller than 0.45 μm, and the carrier has a porosity of 0.1% or higher and lower than 2.8%, when the porosity is expressed by the following equation:

$$\text{Porosity } [\%]=S1/S2\times 100$$

where, on a cross section of the coating layer, S1 represents a cross sectional area of the voids and S2 represents a cross sectional area of the resin.

<2> The carrier according to <1>, in which the chargeable inorganic fine particles include at least one selected from the group consisting of barium sulfate, magnesium oxide, magnesium hydroxide, and hydrotalcite.

<3> The carrier according to <1> or <2>, in which the chargeable inorganic fine particles include barium sulfate, and the amount of barium exposed to the surface of the coating layer is 0.1 atomic % or more.

<4> The carrier according to any one of <1> to <3>, in which the coating layer contains a defoaming agent.

<5> A developer including the carrier according to any one of <1> to <4>.

<6> An image forming method using the developer according to <5>.

<7> An image forming apparatus including the developer according to <5>.

<8> A process cartridge including the developer according to <5>.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A carrier comprising:

a core particle; and, a coating layer coating the core particle, the coating layer comprising a resin, chargeable inorganic fine particles and a defoaming agent, and having voids, the resin having an average film thickness of 0.10 μm or larger and smaller than 0.45 μm, the coating layer having a porosity of 0.1% or higher and lower than 2.8%, the porosity expressed by the following equation:

$$\text{Porosity } [\%]=S1/S2\times 100$$

where, on a cross section of the coating layer, S1 represents a cross sectional area of the voids and S2 represents a cross sectional area of the resin.

2. The carrier according to claim 1, wherein the chargeable inorganic fine particles comprise at least one selected from the group consisting of barium sulfate, magnesium oxide, magnesium hydroxide, and hydrotalcite.

3. The carrier according to claim 1, wherein the chargeable inorganic fine particles comprise barium sulfate, and an amount of barium exposed to a surface of the coating layer is 0.1 atomic % or more.

4. A developer comprising:

a toner; and the carrier according to claim 1.

5. An image forming method comprising:

forming an electrostatic latent image on an electrostatic latent image bearer;

developing the electrostatic latent image formed on the electrostatic latent image bearer using the developer according to claim 4 to form a toner image;
transferring the toner image formed on the electrostatic latent image bearer to a recording medium; and
fixing the toner image to the recording medium.

6. A process cartridge comprising:
an electrostatic latent image bearer;
a charging device configured to charge a surface of the electrostatic latent image bearer;
a developing device accommodating the developer according to claim 4, the developing device configured to develop an electrostatic latent image formed on the electrostatic latent image bearer using the developer; and
a cleaning device configured to clean the electrostatic latent image bearer.

7. The carrier according to claim 1, wherein the coating layer contains conductive particles, the conductive particles including base particles and a conductive component provided on the surfaces on the base particles.

8. The carrier according to claim 7, wherein the base particles comprise aluminum oxide or titanium oxide, and the conductive component comprises a compound in which tin oxide is doped with any of tungsten, indium, and phosphorus, or an oxide thereof.

9. The carrier according to claim 1, wherein the coating layer contains a dispersing agent.

10. The carrier according to claim 9, wherein the dispersing agent comprises a phosphate-based surfactant.

* * * * *